United States Patent
Gené Alujas et al.

(10) Patent No.: US 11,699,055 B2
(45) Date of Patent: Jul. 11, 2023

(54) SELECTIONS OF CORRECTION PROCESSES FOR PRINTING DEVICES

(71) Applicant: HEWLETT-PACKARD DEVELOPMENT COMPANY, L.P., Spring, TX (US)

(72) Inventors: Marc Gené Alujas, Sant Cugat del Valles (ES); Joan Albert Jorba Closa, Sant Cugat del Valles (ES); Andrei Alexandru Dafinoiu, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/446,311

(22) Filed: Aug. 30, 2021

(65) Prior Publication Data
US 2023/0065266 A1   Mar. 2, 2023

(51) Int. Cl.
G06K 15/00 (2006.01)

(52) U.S. Cl.
CPC ... G06K 15/408 (2013.01); *G06K 2215/0085* (2013.01); *G06K 2215/101* (2013.01)

(58) Field of Classification Search
CPC .................................................. G06K 15/408
See application file for complete search history.

(56) References Cited

U.S. PATENT DOCUMENTS

| | | | |
|---|---|---|---|
| 2017/0087910 A1* | 3/2017 | Nagashima | B41J 2/01 |
| 2018/0015733 A1* | 1/2018 | Jorba Closa | B41J 2/2132 |
| 2018/0072081 A1* | 3/2018 | Kimura | B41J 2/195 |
| 2020/0108597 A1* | 4/2020 | Oikawa | B41J 2/0451 |
| 2020/0320434 A1* | 10/2020 | Osano | G06N 5/04 |
| 2022/0088952 A1* | 3/2022 | Sakurada | B41J 19/145 |

OTHER PUBLICATIONS

HP, HP Business Inkjet 3000 Series Printer—Print Quality Issues and Workarounds downloaded from website on Aug. 6, 2021 (16 pages).
HP, Technical White Paper, Third Generation HP Latex Printing Technologies, Mar. 2013 (15 pages).
Mark Bale, Inkjet Insight, Nozzle Correction for Image Quality, Jul. 28, 2021 (8 pages).

* cited by examiner

Primary Examiner — Benjamin O Dulaney (57) ABSTRACT

In some examples, a system detects an error in an printing device, and selects a combination of a medium advance error correction process to address a medium advance error and a faulty nozzle correction process to address a faulty nozzle, where the selecting of the combination is from a plurality of different combinations of the medium advance error correction process and the faulty nozzle correction process, and the selecting is based on a criterion relating to an interaction between the medium advance error and faulty nozzle correction processes.

14 Claims, 4 Drawing Sheets

SELECTIONS OF CORRECTION PROCESSES FOR PRINTING DEVICES

BACKGROUND

A printing device is capable of forming an image onto a print medium, such as a paper medium, a plastic medium, and so forth. A printing device can form an image on a print medium by dispensing a printing fluid onto selected portions of the print medium. For color printing, a printing device can dispense printing fluids of different colors onto a print medium to form a color image.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A printing device includes a medium advance mechanism to advance a print medium relative to a printhead of the printing device. The printhead includes an array of the nozzles through which a printing fluid can be applied to form an image on a print medium that has been advanced by the medium advance mechanism with respect to the printhead. In some examples, a printhead can include a fluidic dispensing die with nozzles formed on the fluidic dispensing die. A printhead can include multiple fluidic dispensing dies in further examples.

Various errors may occur in a printing device. A first type of error is a medium advance error, in which a print medium is advanced by an amount that results in deviation of the print medium from a target position. For example, the print medium may over-advance, in which case the print medium has a portion (e.g., a leading edge) that over-shoots the target position. As another example, the print medium may under-advance, in which case a portion of the medium does not reach the target position.

Errors in advances of print media can cause artifacts to appear in images formed on the print medium. For example, if a print medium were to under-advance, then an artifact in the form of a white or lighter line may be apparent in a printed image due to printing fluids not reaching a corresponding portion of the print medium that was not advanced by a sufficient amount. On the other hand, if a print medium over-advances, then an artifact in the form of a darker line may become apparent in a printed image, due to too much printing fluid being applied on a corresponding portion of the print medium when printing multiple swaths on the print medium. A "swath" refers to a region of the print medium that can be printed by the printing device in one printing pass.

Another type of error that can occur in a printing device includes faulty nozzles. A faulty nozzle refers to a nozzle of a printhead that is unable to deliver a target quantity of a printing fluid. For example, the faulty nozzle may be partially or completely clogged by debris, which can completely or partially block a printing fluid from exiting the nozzle. As another example, a fluidic actuator for a nozzle in the printhead may no longer function, such that the fluidic actuator cannot be activated to cause dispensing of a printing fluid through the nozzle.

In some examples, a printing device can employ a medium advance error correction process and a faulty nozzle correction process. The medium advance error correction process (which in some examples can also be referred to as a dynamic swath advance process) can be used to address a medium advance error. For example, the medium advance error correction process can shift image data relative to nozzles of a printhead to compensate for a medium advance error. The image data is used by the printing device to form an image according to the image data on a print medium. Shifting the image data relative to the nozzles of the printhead effectively adjusts which subset of consecutive nozzles is used in a print operation, so that the nozzles used match the position of the print medium that has experienced the medium advance error. The image data can be shifted in a first direction to cause use of a first subset of consecutive nozzles in response to a print medium over-advancing, and the image data can be shifted in an opposite second direction to cause use of a second subset of consecutive nozzles in response to a print medium under-advancing. The first and second subsets of consecutive nozzles are different from an initial subset of consecutive nozzles that would have been used if a medium advance error were not present.

The faulty nozzle correction process can be used by the printing device to address a faulty nozzle (or multiple faulty nozzles) of the printhead. The faulty nozzle correction process can employ error hiding to replace faulty nozzles with operational nozzles during a print operation. The replacement of faulty nozzles with operational nozzles can be performed in multiple passes of a given printhead. In other examples, faulty nozzles of one printhead can be replaced with operational nozzles of another printhead, so that the correction of the faulty nozzles can be accomplished in a single pass of the printing device.

In some examples, the application of the medium advance error correction process and the faulty nozzle correction process are performed independently of one another. For example, a printing device may apply the medium advance error correction process if the printing device detects a medium advance error, followed by applying the faulty nozzle correction process if the printing device detects a faulty nozzle.

In some examples, a printing device does not consider interactions between the medium advance error correction process and the faulty nozzle correction process. This can result in a medium advance error correction causing a degradation in the performance of the faulty nozzle correction process. For example, a medium advance error correction can result in a larger quantity of consecutive faulty nozzles being used, which can prevent the faulty nozzle correction process from addressing the larger quantity of consecutive faulty nozzles.

In accordance with some implementations of the present disclosure, a printing device is able to select a combination of a medium advance error correction process and a faulty nozzle correction process based on a criterion relating to interaction between the medium advance error and the faulty nozzle correction processes. The selected combination is from among multiple different combinations of the medium advance error correction process and the faulty nozzle correction process, including: 1) a first combination in which both the medium advance error and faulty nozzle correction processes are applied, 2) a second combination in which the medium advance error correction process is not applied and the faulty nozzle correction process is applied, and 3) a third combination in which the medium advance error correction process is applied and the faulty nozzle correction process is not applied process.

Figure 1:
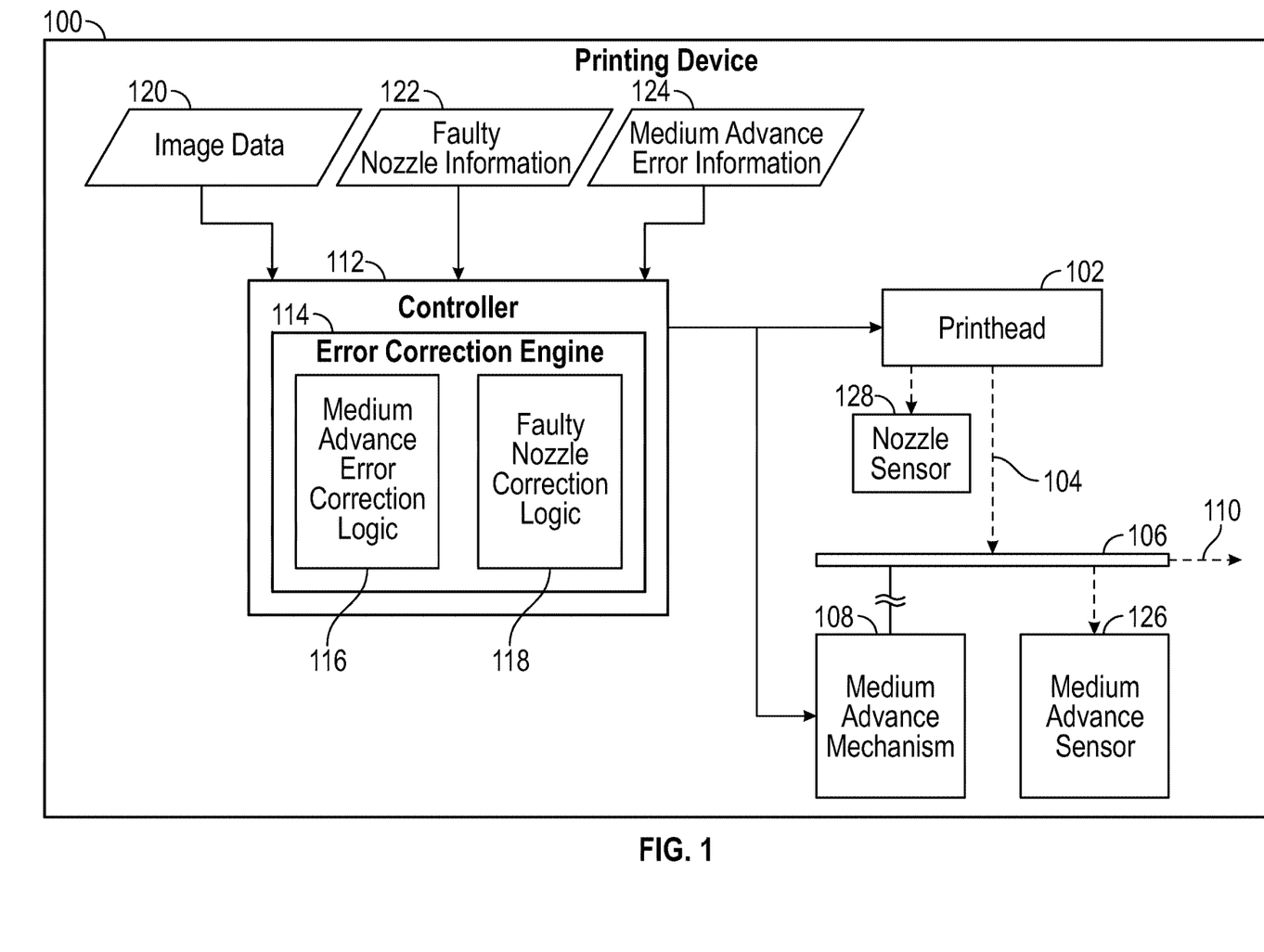
FIG. 1 is a block diagram of an arrangement that includes a system to selectively apply correction processes for a printing device, in accordance with some examples.

FIG. 1 is a block diagram of a printing device 100 that includes a printhead 102 including nozzles to dispense a printing fluid 104 to a surface of a print medium 106. A "nozzle" refers to a structure of the printhead 102 that includes an orifice and a fluidic actuator that when activated causes dispensing of the printing fluid from a fluid chamber adjacent the orifice.

In further examples, the printing device 100 can include multiple printheads 102 for dispensing respective printing fluids, such as printing fluids of different colors.

The printing device 100 includes a medium advance mechanism 108 to advance the print medium 106 along a direction 110 during a print operation. The medium advance mechanism 108 can include rollers and/or other medium transfer members to move the print medium 106 in a given direction (or in multiple directions), in some examples.

Once the print medium 106 has been advanced by the medium advance mechanism 108, the print medium 106 can be moved relative to the printhead 102 in a print direction that is orthogonal to the medium advance direction 110. For example, the orthogonal print direction may be into or out of the page in the view of FIG. 1.

The printing device 100 also includes a controller 112 that can control various operations of the printing device 100. For example, the controller 112 can control operations of the printhead 102 and the medium advance mechanism 108.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

In some examples, the printhead 102 can be mounted on a carriage (not shown) that is movable (under control of the controller 112) relative to the print medium 106 that remains fixed. In other examples, the print medium 106 can be moved relative to the printhead 102 that remains fixed. In yet other examples, both the printhead 102 and the print medium 106 can be moved relative to one another during a print operation.

In accordance with some implementations of the present disclosure, the controller 112 also includes an error correction engine 114 that is able to apply any of various different combinations of a medium advance error correction process and a faulty nozzle correction process. The error correction engine 114 includes a medium advance error correction logic 116 and a faulty nozzle correction logic 118. As used here, an "engine" or "logic" can refer to a portion of the hardware processing circuit of the controller 112, or to machine-readable instructions executable on the hardware processing circuit of the controller 112.

The medium advance error correction logic 116 when invoked by the error correction engine 114 controls application of a medium advance error correction process, and the faulty nozzle correction logic 118 when invoked controls application of a faulty nozzle correction process.

The controller 112 receives image data 120, which represents an image to be formed on the print medium 106. The controller 112 also receives faulty nozzle information 122 and medium advance error information 124.

The printing device 100 includes a medium advance sensor 126 and a nozzle sensor 128. Although referred to in the singular sense, the medium advance sensor 126 or nozzle sensor 128 can represent a collection of multiple sensors that can each acquire corresponding measurement data.

The medium advance sensor 126 can be used to detect whether a medium advance error has occurred. The medium advance sensor 126 can include an optical sensor, for example, to detect a portion of the print medium 106 as the medium advance mechanism 108 moves the print medium 106.

For example, the medium advance sensor 126 can be in the form of a camera that can acquire an image of a portion of the print medium 106 to determine a displacement of the print medium 106. In a different example, the medium advance sensor 126 can include a light source to emit light towards the print medium 106, and a light sensor to detect reflected light from the print medium 106. As a further example, the medium advance sensor 126 can include a physical sensor, such as gear or other rotatable or translatable member to detect an amount of displacement of the print medium 106.

The medium advance sensor 126 can generate a measurement based on the sensing of the print medium 106 as the print medium 106 is moved. Measurement data can be provided by the medium advance sensor 126 to the controller 112 or to an intermediate device. In some examples, the measurement data from the medium advance sensor 126 constitutes the medium advance error information 124. In other examples, the measurement data from the medium advance sensor 126 can be processed by an intermediate device, which can then determine whether a medium advance error has occurred, and can provide an indication of any presence (or lack thereof) of such a medium advance error. Such an indication is included in the medium advance error information 124.

The nozzle sensor 128 can measure each nozzle of the printhead 102. In an example, the nozzle sensor 128 includes an optical sensor to detect print fluid drops dispensed from each nozzle. The controller 112 or an intermediate device can detect blockage of the nozzles of the printhead 102. For example, the nozzle sensor 128 can measure the amount of printing fluid emitted through each nozzle of the printhead 102. The nozzle sensor 128 can be separate from or part of the printhead 102.

The nozzle sensor 128 can provide its measurement data to the controller 112 or to an intermediate device. The faulty nozzle information 122 can include the measurement data from the nozzle sensor 128 or can include information derived by the intermediate device based on measurement data from the nozzle sensor 128. The intermediate device can provide an indication of whether or not respective nozzles of the printhead 102 are blocked as the faulty nozzle information 122. The faulty nozzle information 122 (from the nozzle sensor 128 or from an intermediate device) can provide indications of which nozzles of the printhead 102 are faulty.

Based on the faulty nozzle information 122 and the medium advance error information 124, the error correction engine 114 is able to select a combination from among multiple combinations of the medium advance error correction process (as applied by the medium advance error correction logic 116) and the faulty nozzle correction process (as applied by the faulty nozzle correction logic 118).

As noted above, the multiple combinations include a first combination in which both the medium advance error correction process and the faulty nozzle correction process are applied; a second combination in which the medium advance error correction process is not applied and the faulty nozzle correction process is applied, and a third combination in which the medium advance error correction process is applied but the faulty nozzle correction process is not applied (even though a faulty nozzle(s) is indicated by the faulty nozzle information 122).

The first combination in which both the medium advance error correction process and the faulty nozzle correction process are applied can be divided into two conditions: a first condition in which the medium advance error correction process should be applied and is applied, and the faulty nozzle correction process is also applied, and a second condition in which the medium advance error correction process should not be applied but is applied, and the faulty nozzle correction process is applied.

The medium advance error correction process should be applied if the medium advance error information 124 indicates a medium advance error. The medium advance error correction process should not be applied if the medium advance error information 124 indicates that there is no medium advance error.

Figure 2A:
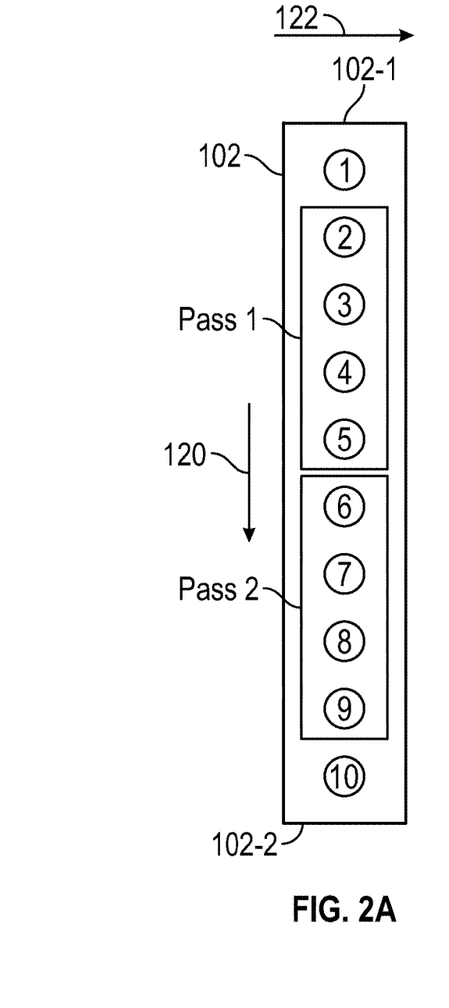
FIGS. 2A-2D illustrate different scenarios for selective application of different correction processes, according to some examples.

FIG. 2A shows a layout of nozzles of the printhead 102. In the example of FIG. 2A, it is assumed that there are 10 nozzles (1-10) on the printhead 102. The specific quantity of nozzles as shown in FIG. 2A is provided as an example, as the printhead 102 in other examples can include a larger quantity or a smaller quantity of nozzles. FIG. 2A also shows a medium advance direction 120 (indicating a direction of advance of the print medium 106 relative to the printhead 102), and a print direction 122 (indicating a direction of movement of the printhead 102 relative to the print medium 106 when printing).

In the depicted example, it is assumed that nozzles 2-9 are nozzles that are normally used (i.e., in the absence of an error such as a medium advance error), while nozzles 1 and 10 are reserved nozzles that are normally not used unless a medium advance error correction is applied. In the example of FIG. 2A, it is also assumed that printing is performed in 2 passes, where a first pass (Pass 1) involves nozzles 2-5 (i.e., in the first pass the nozzles 2-5 are enabled for activation based on the image data 120), and a second pass (Pass 2) involves nozzles 6-9 (i.e., in the first pass the nozzles 6-9 are enabled for activation based on the image data 120). Generally, note that the controller 112 activates specific nozzles according to the image data 120—i.e., whether a given nozzle is activated to dispense a printing fluid depends on the content of a corresponding pixel (or group of pixels) of the image data 120. The normally active nozzles 2-9 are used to form an image according to the image data 120, while the reserved nozzles 1 and 10 are not used normally.

Although FIG. 2A shows two reserved nozzles (1 and 10) for medium advance error correction, in other examples, more than 2 nozzles can be reserved for medium advance error correction. As another example, two or more nozzles can be provided on a first side 102-1 of the printhead 102, and two or more reserved nozzles can be provided on the opposite second side 102-2 of the printhead 102.

Figure 2B:
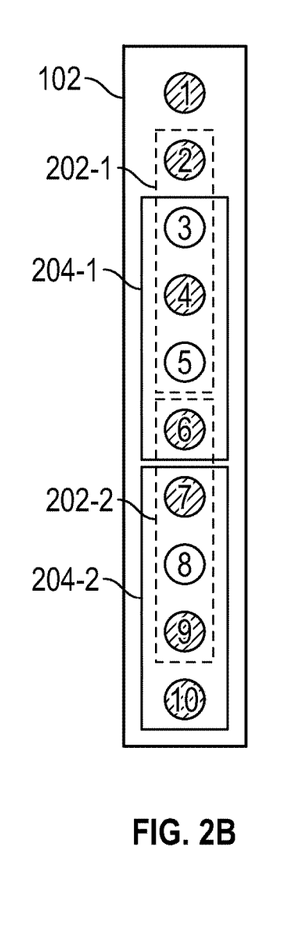

FIG. 2B shows a first example in which the medium advance error correction process applies a +1 nozzle correction. In FIG. 2B, the shaded nozzles (1, 2, 4, 6, 7, 9, and 10) represent working nozzles, and the unshaded nozzles (3, 5, 8) represent faulty nozzles. Dashed boxes 202-1 and 202-2 represent Pass 1 and Pass 2, respectively, that would normally be used if a medium advance error were not applied. Solid boxes 204-1 and 204-2 represent Pass 1 and Pass 2, respectively, that are used as a result of the +1 nozzle medium advance error correction.

Applying a +1 nozzle medium advance error correction refers to shifting the image data 120 by a +1 nozzle position, which causes the subset of consecutive nozzles used for printing to be shifted downwardly in the view of FIG. 2B (e.g., the subset of consecutive nozzles 3-10 are used rather than the subset of consecutive nozzles 2-9). The +1 nozzle correction refers to shifting the image data 120 by a sufficient amount (downwardly by a number of pixel positions corresponding to one nozzle position in the view of FIG. 2B) such that the next subset of consecutive nozzles is used for printing. Shifting the image data 120 can refer to adjusting the positions of pixels in the image data 120 to different positions.

As a result of the +1 nozzle correction, nozzles 3-10 become the active nozzles, while nozzles 1 and 2 become reserved (inactive) nozzles.

After the +1 nozzle correction, in Pass 1 (204-1), nozzles 3-6 are enabled for activation during printing, while in Pass 2 (204-2), nozzles 7-10 are enabled for activation during printing. Faulty nozzle 3 is corrected using nozzle 7 in Pass 2 (by shifting the image data such that an image pixel (or group of pixels) that would have been printed by faulty nozzle 3 is printed by nozzle 7); faulty nozzle 5 is corrected using nozzle 9 in Pass 2 (by shifting the image data such that an image pixel (or group of pixels that would have been printed by faulty nozzle 5 is printed by nozzle 9); and faulty nozzle 8 is corrected using nozzle 4 in Pass 1 (by shifting the image data such that an image pixel (or group of pixels that would have been printed by faulty nozzle 8 is printed by nozzle 4).

In deciding to use both the medium advance error correction process and the faulty nozzle correction process, the error correction engine 114 determines that a quantity of faulty nozzles that cannot be corrected by the faulty nozzle correction process (error hiding) is less than an error value in the medium advance error (in other words, applying the medium advance error correction process does not negatively impact the faulty nozzle correction process, or more generally, does not negatively impact the faulty nozzle correction process by more than a specified threshold, where the specified threshold can refer to zero or a positive quantity of nozzles). For example, if the medium advance error is X nozzle(s) in size (i.e., the print medium 106 after being advanced is offset from the target position by X nozzle(s) (this is the "error value" of the medium advance error), where X can be zero or greater than zero and can be positive or integer), then the error correction engine 114 determines whether an application of the medium advance error correction process to shift the image data by X nozzle(s) would cause the quantity of faulty nozzles that cannot be corrected by the faulty nozzle correction process to be less than X+T, where T is the specified threshold and can be 0 or a positive number (1 or greater) of nozzles. If the error correction engine 114 determines that the application of the medium advance error correction process to shift the image data by X nozzle(s) would cause the quantity of faulty nozzles that cannot be corrected by the faulty nozzle correction process to be less than X+T, then the error correction engine 114 would select a combination in which the medium advance error correction process is applied (and the faulty nozzle correction process is applied assuming there is a faulty nozzle).

Note that prior to the shifting of the image data 120 as shown in FIG. 2B, the faulty nozzle correction process would have been able to correct the 3 faulty nozzles using all three operational nozzles in Pass 1 (202-1) and Pass 2 (202-2). After applying the medium advance error correction as shown in FIG. 2B, the 3 faulty nozzles can still be corrected using operational nozzles in Pass 1 (204-1) and Pass 2 (204-2). Stated differently, application of the +1 medium advance error correction does not increase the quantity of faulty nozzles due to missed faulty nozzle correction (error hiding) opportunities.

Figure 2C:
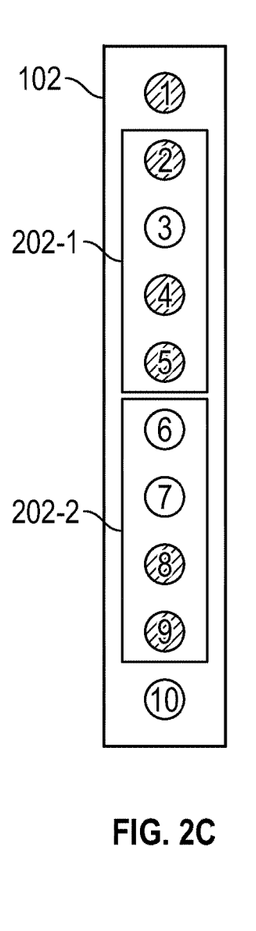

FIG. 2C shows a different example in which there are 4 faulty nozzles 3, 6, 7, and 10. Note that the reserved nozzle 10 is also faulty in this example. Prior to applying a +1 nozzle medium advance error correction that would have shifted the image data 120 downwardly by one nozzle position (in the view of FIG. 2C), there are 3 faulty nozzles (3, 6, and 7), and faulty nozzle 6 can be corrected using operational nozzle 2 in Pass 1 (note that faulty nozzles 3 and 7 cannot be corrected using the faulty nozzle correction process). In other words, after faulty nozzle correction, two faulty nozzles 3 and 7 would remain.

On the other hand, if the +1 nozzle medium advance error correction were applied and the image data were shifted downwardly, then the quantity of faulty nozzles that cannot be corrected would increase by 2. In the example of FIG. 2C, after the +1 nozzle medium advance error correction, none of faulty nozzles 3, 6, 7, and 10 can be corrected using error hiding (faulty nozzle correction). In response to detecting that the +1 nozzle medium advance error correction would increase the quantity of faulty nozzles that cannot be corrected using error hiding, the error correction engine 114 would disable application of the medium advance error correction process even though a medium advance error was indicated in the medium advance error information 124. More generally, in the example of FIG. 2D, the quantity of faulty nozzles that cannot be corrected by the faulty nozzle correction process is not less than X+T.

Figure 2D:
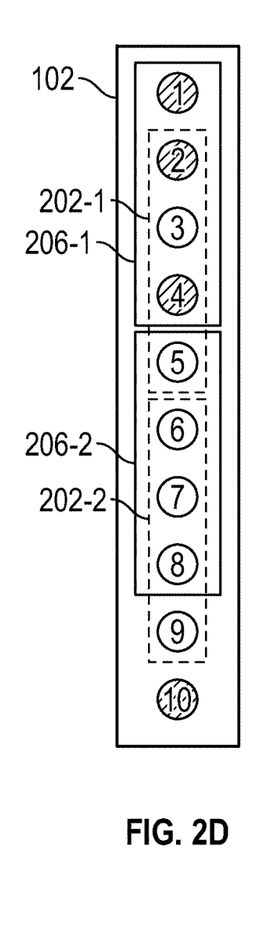

FIG. 2D shows a different example in which applying a medium advance error correction of −1 nozzle improves the faulty nozzle correction. Applying a −1 nozzle medium advance error correction refers to shifting the image data 120 by a −1 nozzle position, which causes the subset of consecutive nozzles used for printing to be shifted upwardly in the view of FIG. 2D (e.g., the subset of consecutive nozzles 1-8 is used rather than the subset of consecutive nozzles 2-9). In the example of FIG. 2D, nozzles 3, 5, 6, 7, 8, and 9 are faulty, and nozzles 1, 2, 4, and 10 are operational. Solid boxes 206-1 and 206-2 represent Pass 1 and Pass 2, respectively, that are used as a result of the −1 nozzle medium advance error correction.

Prior to the medium advance error correction of −1 pixel, the faulty nozzle 6 can be corrected using operational nozzle 2 in Pass 1 (202-1), and faulty nozzle 8 can be corrected using operational nozzle 4 in Pass 1 (202-1). However, based on application of the −1 nozzle medium advance error correction, faulty nozzles 5, 6, and 8 can be corrected using respective operational nozzles 1, 2, and 4 in Pass 1 (206-1). This can be an example in which there was no medium advance error but the medium advance error correction of −1 nozzle is applied to improve the faulty nozzle correction process.

Figure 3:
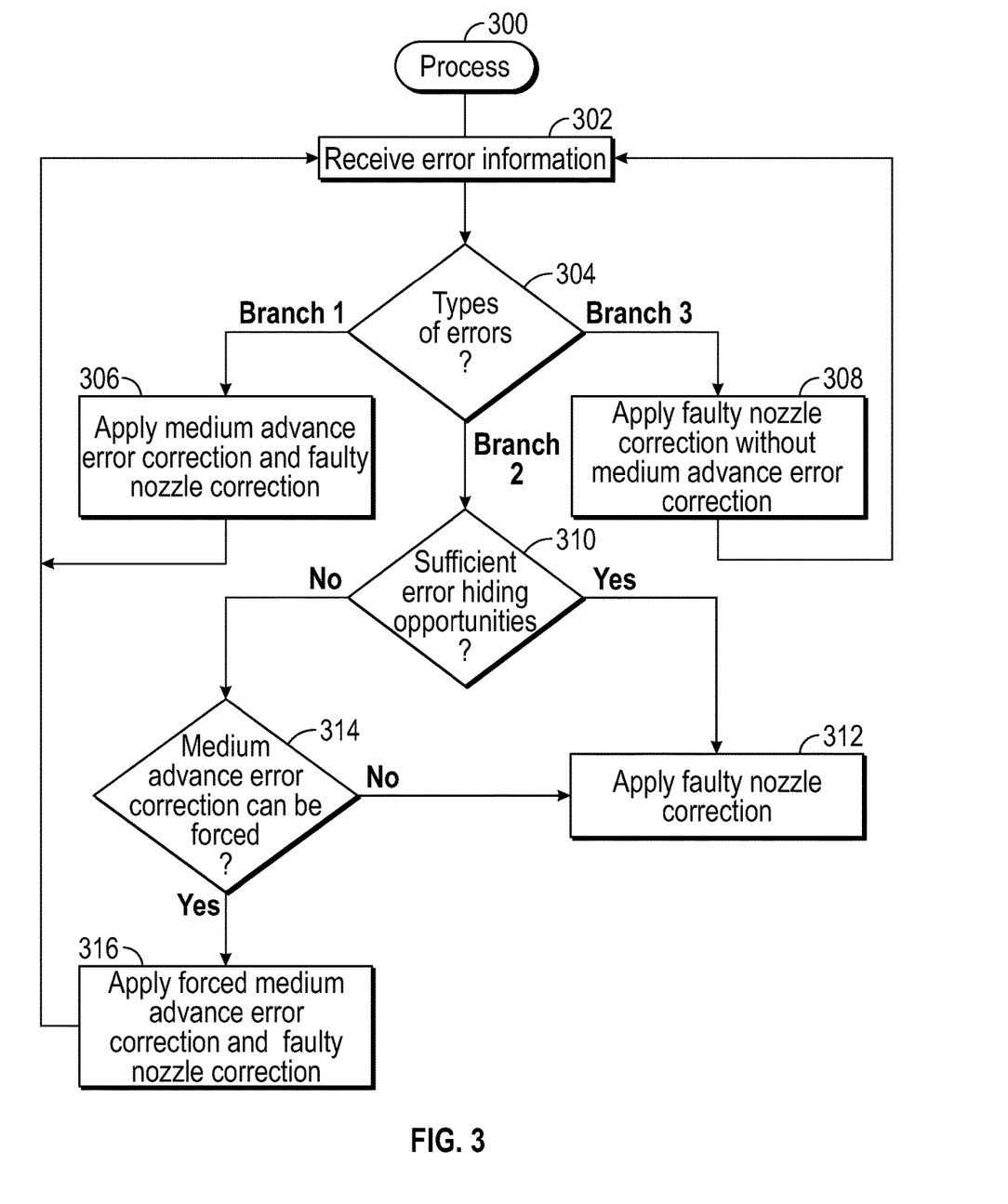
FIG. 3 is a flow diagram of a process according to some examples.

FIG. 3 shows an example process 300 that can be performed by the error correction engine 114 according to some examples. The error correction engine 114 receives (at 302) error information (including the faulty nozzle information 122 and the medium advance error information 124). The error correction engine 114 determines (at 304) the types of errors (if any) that are present and whether or not application of the medium advance error correction process would negatively impact the faulty nozzle correction process by greater than a specified threshold (in examples where there are both a medium advance error and a faulty nozzle error).

Three branches (1, 2, and 3) can be taken from the decision diamond 304 based on the error type.

If the application of a medium advance error correction results in the quantity of faulty nozzles that cannot be corrected by the faulty nozzle correction process to be less than X+T (stated differently, the application of the medium advance error correction does not negatively impact the faulty nozzle correction process by X+T or more), then branch 1 is taken from the decision diamond 304.

However, if the application of a medium advance error correction results in the quantity of faulty nozzles that cannot be corrected by the faulty nozzle correction process to be greater than or equal to X+T (stated differently, the application of the medium advance error correction negatively impacts the faulty nozzle correction process by X+T or more), then branch 3 is taken from the decision diamond 304.

Taking branch 1 results in the error correction engine 114 selecting (at 306) a combination that includes applying both the medium advance error correction process and the faulty nozzle correction process.

Taking branch 3 results in the error correction engine 114 selecting (at 308) application of the faulty nozzle correction process but not the application of the medium advance error correction process (even though the medium advance error correction process should be taken due to presence of a medium advance error).

If there is no medium advance error, then branch 2 is taken from the decision diamond 304. From branch 2, the error correction engine 114 determines (at 310) if there are sufficient error hiding opportunities; i.e., whether there are enough operational nozzles of the printhead 102 to correct faulty nozzles of the printhead 102 (such as in multiple passes). If there are sufficient error hiding opportunities, then the error correction engine 114 applies (at 312) the faulty nozzle correction process, without applying the medium advance error correction process.

If the error correction engine 114 determines (at 310) there are insufficient error hiding opportunities, then the error correction engine 114 determines (at 314) whether a medium advance error correction can be forced. Forcing the application of the medium advance error correction process refers to applying the medium advance error correction process even though no medium advance error is present.

If the error correction engine 114 determines (at 314) that the medium advance error correction cannot be forced, then the error correction engine 114 applies (at 312) the faulty nozzle correction process, without applying the medium advance error correction process. In some examples, the medium advance error correction cannot be forced if by applying the medium advance error correction causes introduction of an image quality defect that would be greater than the image quality defect caused by nozzles not corrected by error hiding.

However, if the error correction engine 114 determines (at 314) that the medium advance error correction can be forced, then the error correction engine 114 applies (at 316) both the forced medium advance error correction process and the faulty nozzle correction process.

Figure 4:
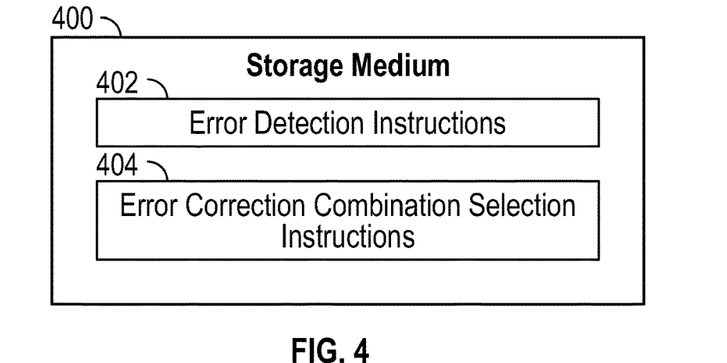
FIG. 4 is a block diagram of a storage medium storing machine-readable instructions, according to some examples.

FIG. 4 is a block diagram of a non-transitory machine-readable or computer-readable storage medium 400 storing machine-readable instructions that upon execution cause a system to perform various tasks. The system can include a computer in the printing device 100 (e.g., the controller 112 of FIG. 1), or a computer outside the printing device 100.

The machine-readable instructions include error detection instructions 402 to detect an error in the printing device. The detected error can include a faulty nozzle error and/or a medium advance error.

The machine-readable instructions include error correction combination selection instructions 404 to select a combination of a medium advance error correction process to address a medium advance error and a faulty nozzle correction process to address a faulty nozzle, where the selecting of the combination is from a plurality of different combinations of the medium advance error correction process and the faulty nozzle correction process, and the selecting is based on a criterion relating to an interaction between the medium advance error and faulty nozzle correction processes.

For example, the criterion relating to the interaction between the medium advance error and faulty nozzle correction processes includes a criterion relating to a decrease in effectiveness of the faulty nozzle correction process due to an application of the medium advance error correction process. The selecting of the combination of the medium advance error correction process and the faulty nozzle correction process based on the criterion includes selecting the combination in which the medium advance error correction process is not applied and the faulty nozzle correction process is applied responsive to a determination that the application of the medium advance error correction process would decrease the effectiveness of the faulty nozzle correction process.

As a further example, the selecting of the combination of the medium advance error correction process and the faulty nozzle correction process based on the criterion includes selecting the combination in which the medium advance error correction process is not applied and the faulty nozzle correction process is applied responsive to a determination that a quantity of faulty nozzles that cannot be corrected by the faulty nozzle correction process is less than an error value in the medium advance error. In some examples, the error value in the medium advance error corresponds to a quantity of nozzles in which the print medium deviates from a target position after the print medium is advanced.

In further examples, the criterion relating to the interaction between the medium advance error and faulty nozzle correction processes includes a criterion relating to an increase in effectiveness of the faulty nozzle correction process due to an application of the medium advance error correction process.

In further examples, the machine-readable instructions can detect that there is no medium advance error, where the selecting of the combination of the medium advance error correction process and the faulty nozzle correction process based on the criterion includes selecting the combination in which the medium advance error correction process is applied and the faulty nozzle correction process is applied responsive to a determination that the application of the medium advance error correction process would increase the effectiveness of the faulty nozzle correction process.

Figure 5:
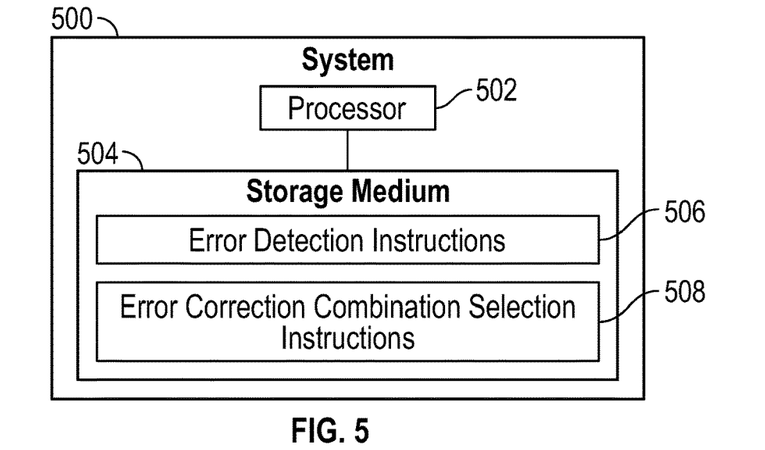
FIG. 5 is a block diagram of a system according to some examples.

FIG. 5 is a block diagram of a system 500, which can include a printing device (e.g., 100) or a computer separate from a printing device. The system includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The system 500 further includes a storage medium 504 storing machine-readable instructions that are executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include error detection instructions 506 to detect an error in a printing device.

The machine-readable instructions in the storage medium 504 further include error correction combination selection instructions 508 to select a combination of a medium advance error correction process and a faulty nozzle correction process. The selecting of the combination is from a plurality of different combinations of the medium advance error correction process and the faulty nozzle correction process, and the selecting is based on a criterion relating to an interaction between the medium advance error and faulty nozzle correction processes.

The plurality of different combinations of the medium advance error correction process and the faulty nozzle correction process include a first combination in which both the medium advance error and faulty nozzle correction processes are applied, and a second combination in which the medium advance error is not applied and the faulty nozzle correction process is applied.

Figure 6:
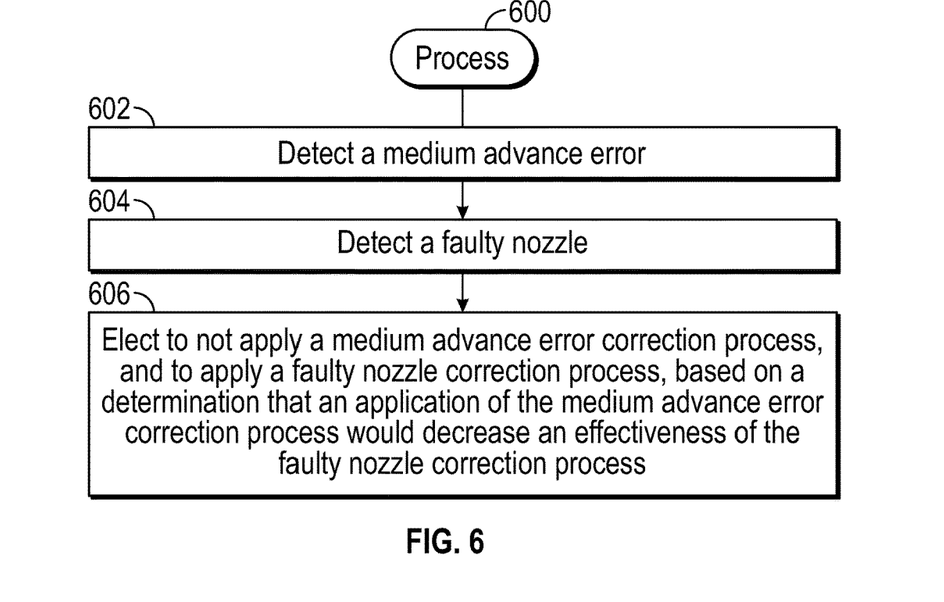
FIG. 6 is a flow diagram of a process according to further examples.

FIG. 6 is a flow diagram of a process 600 that can be performed by a system, such as the controller 112 of FIG. 1.

The process 600 includes detecting (at 602) a medium advance error in a printing device The process 600 includes detecting (at 604) a faulty nozzle in the printing device.

The process 600 includes electing (at 606) to not apply a medium advance error correction process to address the medium advance error, and apply a faulty nozzle correction process to address the faulty nozzle. The electing is based on a determination by the system that an application of the medium advance error correction process would decrease an effectiveness of the faulty nozzle correction process.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
    detect an error in a printing device; and
    select a combination of a medium advance error correction process to address a medium advance error and a faulty nozzle correction process to address a faulty nozzle, wherein the selecting of the combination is from a plurality of different combinations of the medium advance error correction process and the faulty nozzle correction process, and the selecting is based on a criterion relating to an interaction between the medium advance error correction process and faulty nozzle correction process.

2. The non-transitory machine-readable storage medium of claim 1, wherein the detected error comprises a medium advance error in which a print medium on which an image is to be formed advances by an amount that results in deviation of the print medium from a target position.

3. The non-transitory machine-readable storage medium of claim 2, wherein the instructions upon execution cause the system to:
    detect a faulty nozzle error in the printing device,
    wherein the selected combination comprises applying the faulty nozzle correction process without applying the medium advance error correction process.

4. The non-transitory machine-readable storage medium of claim 1, wherein the detected error comprises a faulty nozzle of the printing device.

5. The non-transitory machine-readable storage medium of claim 4, wherein the selected combination comprises applying the medium advance error correction process without applying the faulty nozzle correction process.

6. The non-transitory machine-readable storage medium of claim 1, wherein the criterion relating to the interaction between the medium advance error and faulty nozzle correction processes comprises a criterion relating to a decrease in effectiveness of the faulty nozzle correction process due to an application of the medium advance error correction process.

7. The non-transitory machine-readable storage medium of claim 6, wherein the selecting of the combination of the medium advance error correction process and the faulty nozzle correction process based on the criterion comprises selecting the combination in which the medium advance error correction process is not applied and the faulty nozzle correction process is applied responsive to a determination that the application of the medium advance error correction process would decrease the effectiveness of the faulty nozzle correction process.

8. The non-transitory machine-readable storage medium of claim 6, wherein the selecting of the combination of the medium advance error correction process and the faulty nozzle correction process based on the criterion comprises selecting the combination in which the medium advance error correction process is not applied and the faulty nozzle correction process is applied responsive to a determination that a quantity of faulty nozzles that cannot be corrected by the faulty nozzle correction process is less than an error value in the medium advance error.

9. The non-transitory machine-readable storage medium of claim 8, wherein the error value in the medium advance error corresponds to a quantity of nozzles in which a print medium deviates from a target position after the print medium is advanced.

10. The non-transitory machine-readable storage medium of claim 1, wherein the criterion relating to the interaction between the medium advance error and faulty nozzle correction processes comprises a criterion relating to an increase in effectiveness of the faulty nozzle correction process due to an application of the medium advance error correction process.

11. The non-transitory machine-readable storage medium of claim 10, wherein the instructions upon execution cause the system to:
    detect that there is no medium advance error,
    wherein the selecting of the combination of the medium advance error correction process and the faulty nozzle correction process based on the criterion comprises selecting the combination in which the medium advance error correction process is applied and the faulty nozzle correction process is applied responsive to a determination that the application of the medium advance error correction process would increase the effectiveness of the faulty nozzle correction process.

12. A system comprising:
    a processor; and
    a non-transitory storage medium storing instructions executable on the processor to:
        detect an error in a printing device; and
        select a combination of a medium advance error correction process to address a medium advance error and a faulty nozzle correction process to address a faulty nozzle, wherein the selecting of the combination is from a plurality of different combinations of the medium advance error correction process and the faulty nozzle correction process, and the selecting is based on a criterion relating to an interaction between the medium advance error correction process and faulty nozzle correction process, and
        wherein the plurality of different combinations of the medium advance error correction process and the faulty nozzle correction process comprise:

a first combination in which both the medium advance error and faulty nozzle correction processes are applied, and a second combination in which the medium advance error is not applied and the faulty nozzle correction process is applied.

13. The system of claim 12, wherein the criterion relating to the interaction between the medium advance error and faulty nozzle correction processes comprises a criterion relating to a decrease in effectiveness of the faulty nozzle correction process due to an application of the medium advance error correction process, and the instructions are executable on the processor to:

select the second combination responsive to a determination that the application of the medium advance error correction process would decrease the effectiveness of the faulty nozzle correction process.

14. The system of claim 12, wherein the instructions are executable on the processor to:

detect that there is no medium advance error; and select the first combination responsive to a determination that the application of the medium advance error correction process would increase an effectiveness of the faulty nozzle correction process.

* * * * *